United States Patent [19]
Trigo

[11] Patent Number: 5,839,759
[45] Date of Patent: Nov. 24, 1998

[54] VEHICLE CAPTURE DEVICE

[76] Inventor: Kevin A. Trigo, 49 Carriage Dr., Lincoln, R.I. 02865

[21] Appl. No.: 812,272

[22] Filed: Mar. 6, 1997

[51] Int. Cl.[6] .............................. B60D 1/04; B60D 1/36; B60D 1/54; B60R 25/00
[52] U.S. Cl. .................. 280/762; 280/479.1; 280/491.5; 280/508; 180/287
[58] Field of Search ............................... 280/762, 460.1, 280/479.1, 481, 491.1, 491.3, 491.5, 498, 505, 508; 180/287, 14.1

[56] References Cited

U.S. PATENT DOCUMENTS

| | | | |
|---|---|---|---|
| 2,107,312 | 2/1938 | Thompson | 280/505 |
| 2,157,612 | 5/1939 | Kirk | 280/505 |
| 2,194,623 | 3/1940 | Thompson | 280/491.5 |
| 2,625,278 | 1/1953 | Sensenbaugh | 280/479.1 |
| 4,773,666 | 9/1988 | Koberlein et al. | 280/508 |

*Primary Examiner*—Peter C. English
*Attorney, Agent, or Firm*—Robert J. Doherty

[57] ABSTRACT

A vehicle capture device and method of utilizing such to stop the progress of a fleeing vehicle. The device is mounted to the front of a chase vehicle and includes arms which include hook portions that are capable of initially extending outwardly under portions of the fleeing vehicle and then extending upwardly so that the hook portions grasp undercarriage portions of the fleeing vehicle after which the chase vehicle may brake to a stop so as to, in effect, capture the fleeing vehicle in a safe positive manner.

6 Claims, 6 Drawing Sheets

VEHICLE CAPTURE DEVICE

BACKGROUND AND OBJECTS OF THE INVENTION

Document Disclosure No. 403144 dated Aug. 1, 1996 pertains to this invention.

This invention is directed to a capture device intended primarily for use with police vehicles such that upon operation of the device police in a chase car may stop and apprehend a fleeing vehicle by positively hooking onto the bumper or undercarriage portions of the fleeing vehicle and in this way stop its progress in a safe, positive and effective way.

DESCRIPTION OF RELATED ART

An ever increasing problem in modern society is the safe and effective apprehension of criminals and the like fleeing in vehicles from law authority personnel also in vehicles. This sets up a chase situation that leads to dangerous, high speed or low speed pursuits that can endanger the public at large as well as the law enforcement personnel involved. Presently, various ways of handling a fleeing vehicle include shooting out the fleeing vehicle's tires or even following the fleeing vehicle for miles until it crashes or runs out of fuel. In addition, crash barriers can be erected in the path of the fleeing vehicle or nails either loosely strewn or attached to strips can be used to puncture tires. Other suggested mechanisms include the use of a barbed harpoon being test marketed in Finland as well as devices which disable the fleeing vehicle's engine by burning out the ignition by electronic or microwave energy. All of these above-mentioned mechanisms include obvious drawbacks. For instance, disabling the fleeing vehicle's engine would also cause the fleeing vehicle to loose its power steering and brakes and thus especially at high speeds could lead to a serious accident; harpooning on the other hand could in some cases lead to impaling the driver or passenger in the fleeing vehicle while nail strips, crash barriers and the like require a team work approach and preparation time that may not also be available under many circumstances.

Some prior art attempts to positively grasp a fleeing vehicle have been suggested in the following U.S. patents: U.S. Pat. No. 2,194,623 issued Mar. 26, 1940; U.S. Pat. No. 2,157,612 issued May 9, 1939; and U.S. Pat. No. 2,107,312 issued Feb. 8, 1938. All of these patents utilize a mechanism mounted in the front of the chase vehicle normally a police vehicle which device includes grasping jaws which when propelled against the rear portion of the fleeing vehicle can cause attachment thereto normally by grasping the rear bumper thereof. However, most of today's vehicles do not include the projecting type of rear bumpers commonly in use over fifty years ago; and, accordingly, the need continues to exist for a safe, effective and generally low cost device that when attached to the front of a pursuit or chase vehicle can be utilized when such vehicle is in close proximity to the fleeing vehicle to project a portion of such device underneath and then upwardly towards such fleeing vehicle to capture and grasp the bumper or other undercarriage portions of the fleeing vehicle in such a manner that the chase vehicle can then gradually brake to a stop so as to halt the progress of the fleeing vehicle which is thus attached, in effect, to the chase vehicle.

SUMMARY OF THE INVENTION

These and other objects of the present invention are accomplished by the use of a capture device mounted on the front end of a chase vehicle for positively engaging portions of the undercarriage of a fleeing vehicle positioned in front of and in close adjacent contact to said chase vehicle, said capture device comprising means for attachment to the front end of the chase vehicle and at least one movable arm having a bottom end and a forward end and having an upwardly extending terminal hook portion at said forward end, said arm in turn mounted on said front end and movable between a storage position to an extended first operable position wherein said arm outwardly forwardly extends from said chase vehicle front end and beneath the undercarriage of the fleeing vehicle and subsequently to a second operable position elevated from said first operable position wherein said hook portion is capable of entrapping portions of the undercarriage of the fleeing vehicle, said hook portion having inner and outer surfaces and being open at said inner surface with said open inner surface oriented towards said chase vehicle front end in the storage position and upwardly in said operable position, and actuation means for moving said arm from said storage position to said first operable position and subsequently to said second operable position.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DESCRIPTION OF THE PREFERRED EMBODIMENT

Turning now to the drawings, it may be apparent that the device 10 of the present invention is shown attached to the front end 12 of a standard vehicle such as a police cruiser also hereinafter referred to as the chase vehicle and having a front bumper 14. The device 10 includes a frame 16 including a pair of upright members 18 laterally separated from each other and rearwardly supported by a plurality of plates 20 rearwardly extending therefrom and adapted to be custom fitted for the bumper 14 of any particular vehicle, that is, rearwardly extending various distances so as to contact the front face of the bumper so as to give support and rigidity to the upright members 18. A lower plate 22 which may be integral with or separate from the lowermost plate 20 is bar positioned underneath the frame and attached to a solid metal portion of the bumper by bolts 24. The lower plate 22 includes at its forward edge a pair of trunnions 26 having an opening therethrough and in turn supporting a longitudinally oriented transversely extending rod or bar 28 which in part makes up the assembly of the capture device itself. Such above-indicated structure enables the bar 28 to rotate in a plane extending normally transversely therethrough as shown by the arrows in both FIGS. 5 and 6.

Figure 1:
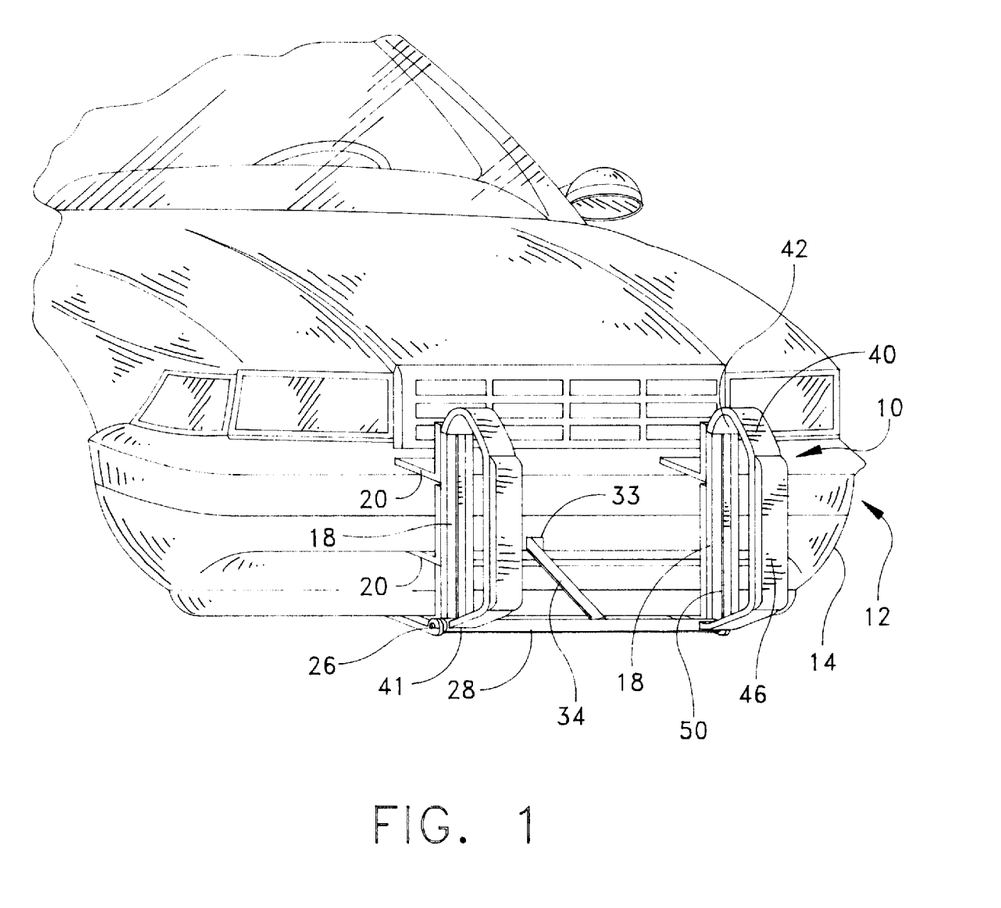
FIG. 1 is a front perspective view of the device of the present invention shown mounted to the front end of a police vehicle.
Figure 1A:
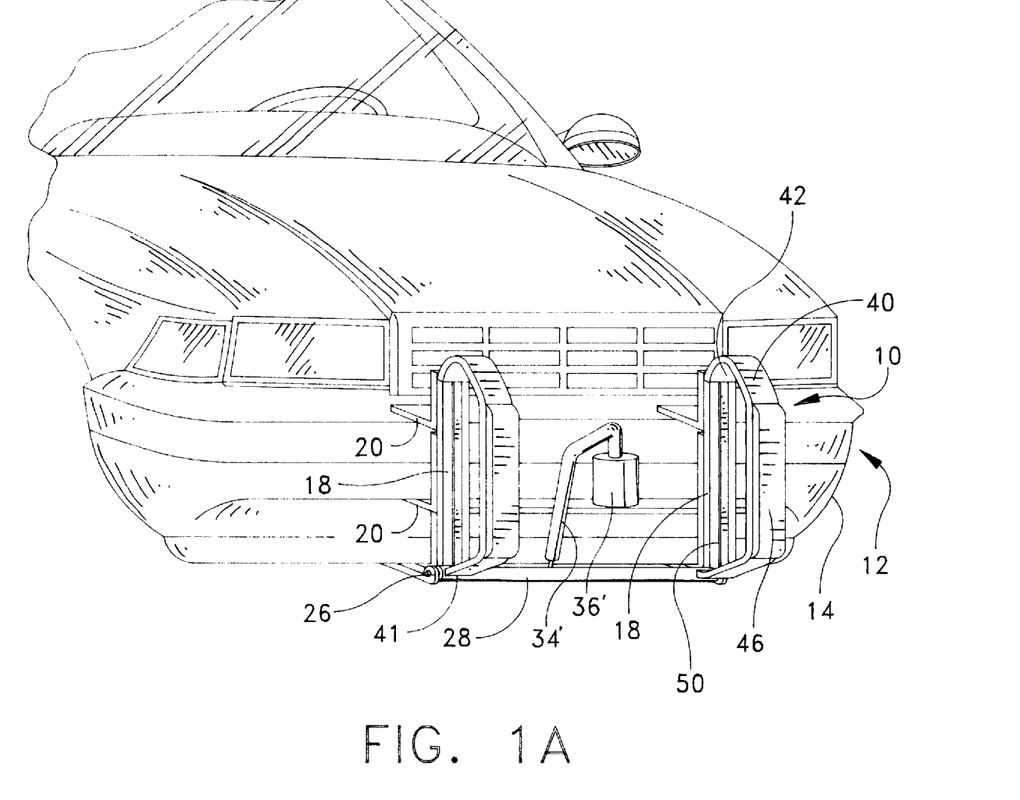
FIG. 1A is a front perspective view of a modified form of the invention.
Figure 2:
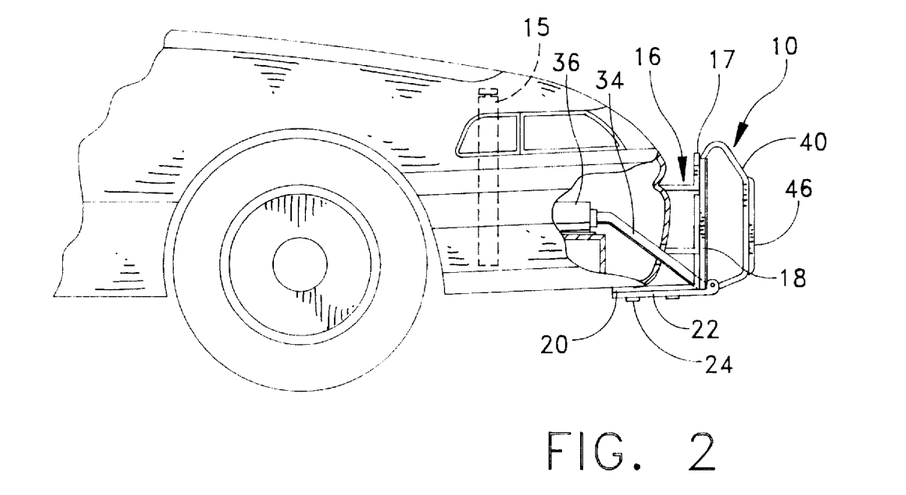
FIG. 2 is a side elevational view taken from the left side of FIG. 1.
Figure 3:
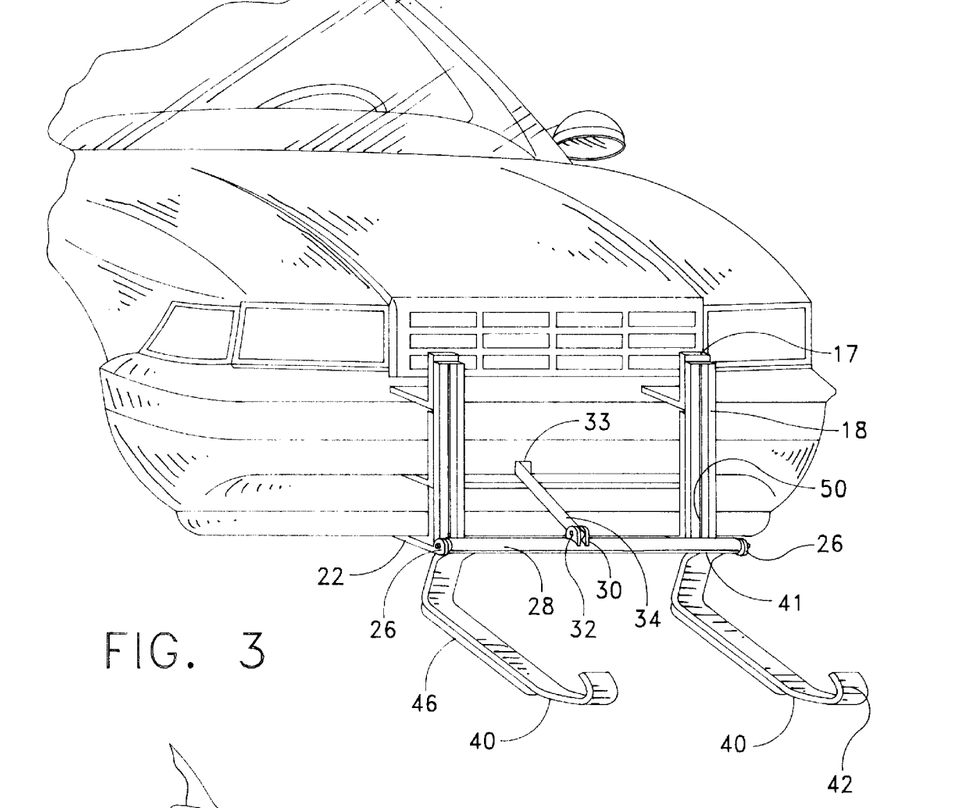
FIG. 3 is a view similar to FIG. 1 but showing the forwardly extending arm portions of the capture device of the present invention in their extended first operable position.
Figure 4:
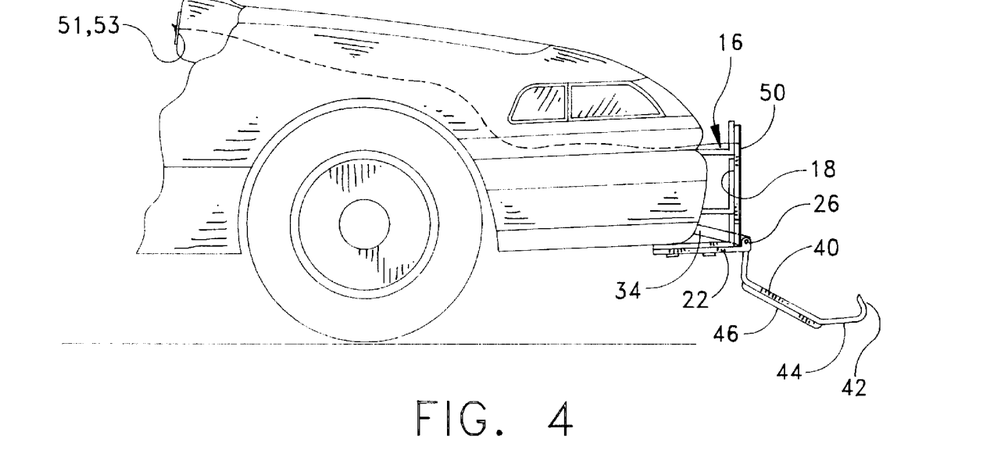
FIG. 4 is a side elevational view taken from left side of FIG. 3.

A fixed offset link 30 is fixedly attached to the bar 28 and includes an opening or other connection mechanism 32 to which an arm or connecting rod 34 of a reciprocal piston 36 is attached. Such piston and the connecting rod 34 may be mounted on the top of one of the rearwardly extending plates 20 as shown in FIG. 1A or more preferably may be mounted on the vehicle frame inwardly of the bumper 14 in a position, of course, in front of the radiator 15 and thence forwardly connected to the link 30 through mechanism 32. An opening 33 through the bumper 14 may be provided through which the rod 34 extends. The piston 36 can be activated as by an electrical switch or switches to move rearwardly or forwardly so as to control the rotational motion of the bar 28.

Figure 5:
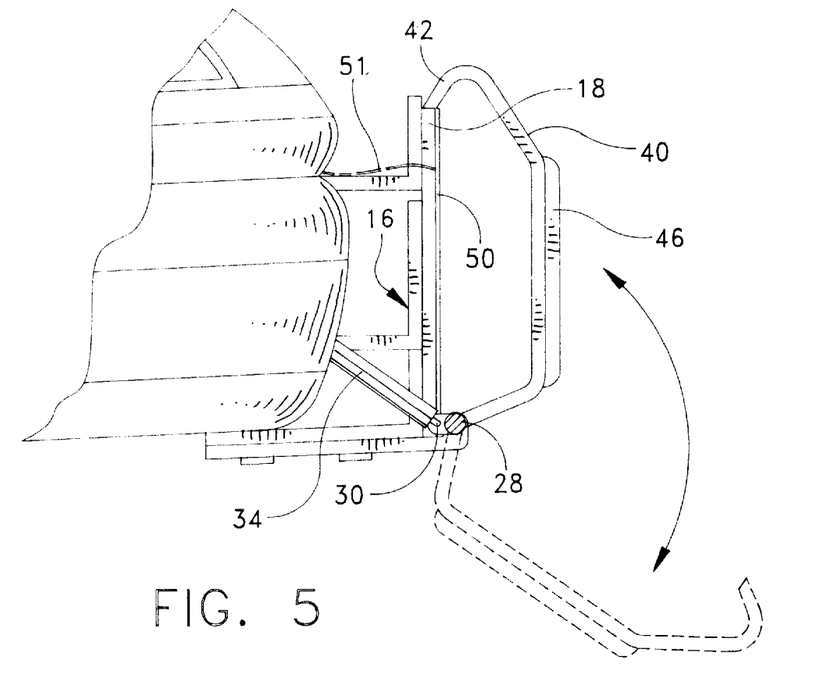
FIG. 5 is a partial side elevational view similar to FIGS. 2 and 4 but showing the movement of the arms from a non-operable storage position shown in solid lines to the forwardly extended first operable position shown in dotted lines.

A pair of arms 40 are connected to the bar 28 at their inner or lower ends 41, that is, the arms 40 are fixed to the bar 28 so as to move in unison therewith such that the activation of the arms between their storage and operable positions as will hereinafter be brought out is facilitated by the aforementioned rotational or partial pivotal movement afforded to the bar 28 by the piston 36. The arms 40 are in turn preferably of a general C shape in that they outwardly extend from their inner or lower ends towards their forward terminal end and, in effect, form an open hook portion at the inner surfaces thereof. In addition, the hook portion preferably terminates in a partially inwardly extending finger 42. Such hook portion has inner and outer surfaces and is open at such inner surface such that said open inner surface is oriented towards the chase vehicle front end in the storage position and upwardly in its operable positions. Also, a portion of the outer surface 44 of the arm 40 is preferably provided with a coating or independent pad element 46 which is abrasion resistant and preferably formed from a hard rubber-like material such as would be utilized in conjunction with normal push bumpers. It is this pad or surface 46 which is presented in an upright position for contact with other vehicles when the arms are placed in the upright storage position as shown in FIG. 5. It should also be pointed out that in this position the arms and the remaining portions of the device 10, in effect, present the appearance of a pair of standard push-type bumpers that are normally mounted on the front end of police type vehicles. Such pads or surfaces 46 thus serve not only the conventional purpose of providing a high wearing friction contact surface for vehicles and the like; but when the arms are activated to their lowermost forwardly extending first operable position such as shown in the solid lines in FIG. 6, the pad surface will be positioned lowermost and thus should that outer surface of the arms protected by the pads come in contact with the ground or road surface then the abrasion resistance of such pads will enable such high speed contact or repeated contact with the road surface without wearing out and preventing the creation of sparks since the arms 40 are preferably made of a lightweight yet high strength metallic material such as steel or the like. It should be pointed out that the preferable positioning of the arm 40 in its first operable position, that is, forwardly extending and thus adapted to project underneath the fleeing vehicle, is such that the arm 40 is spaced above the road surface. In other words, the intention is not to make arm to road contact but to provide for such when it does occur. The frame 16 and the upright members 18 are also preferably formed of such material.

Figure 6:
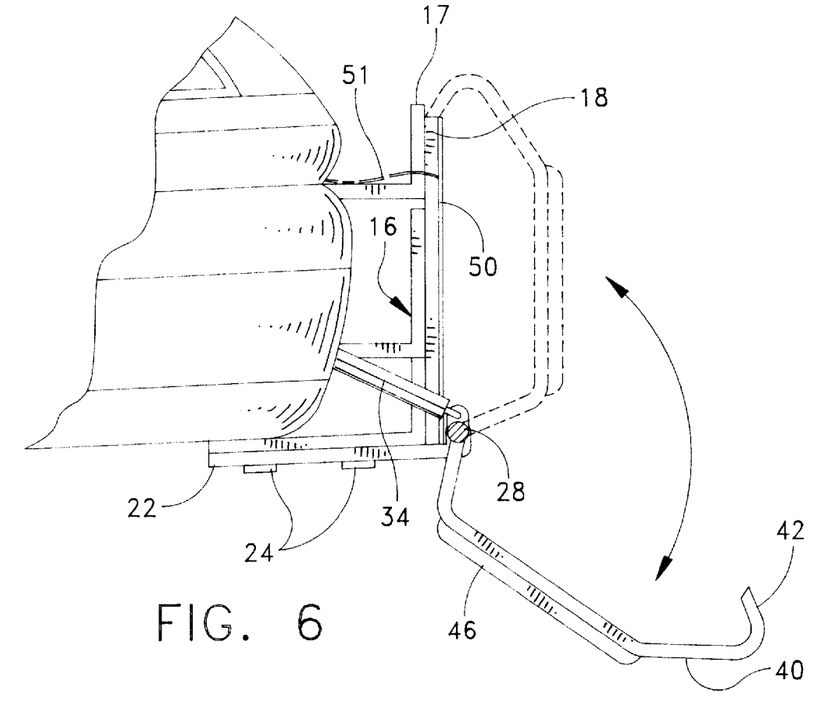
FIG. 6 is a side elevational view similar to FIG. 5 but showing the arms shown in their forward first operable position in solid lines.

Also as best shown in FIGS. 5 and 6, the frame or bracket 16 includes a portion 17 which extends slightly above the upright members 18 such that when the terminal end of the finger rests on the top of the upright member 18 in the storage or rest position, any potential for rearward movement will be restrained by such frame or bracket as when utilizing the device for pushing disabled vehicles or the like.

Figure 7:
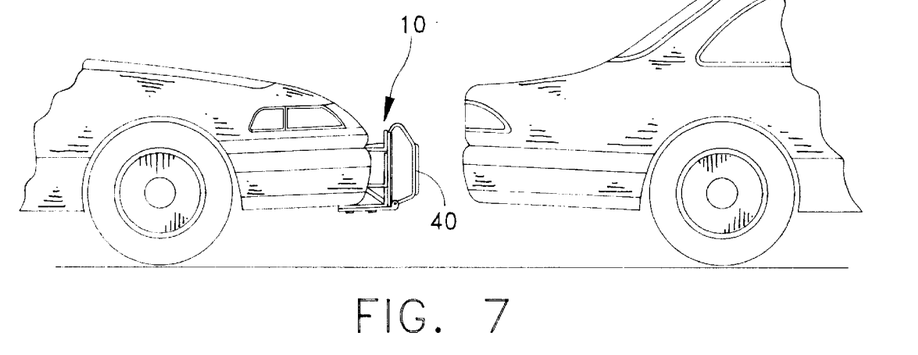
FIG. 7 is a side elevational view showing the chase and fleeing vehicles prior to the actuation of the device to the first operable position as shown in FIG. 6.
Figure 10:
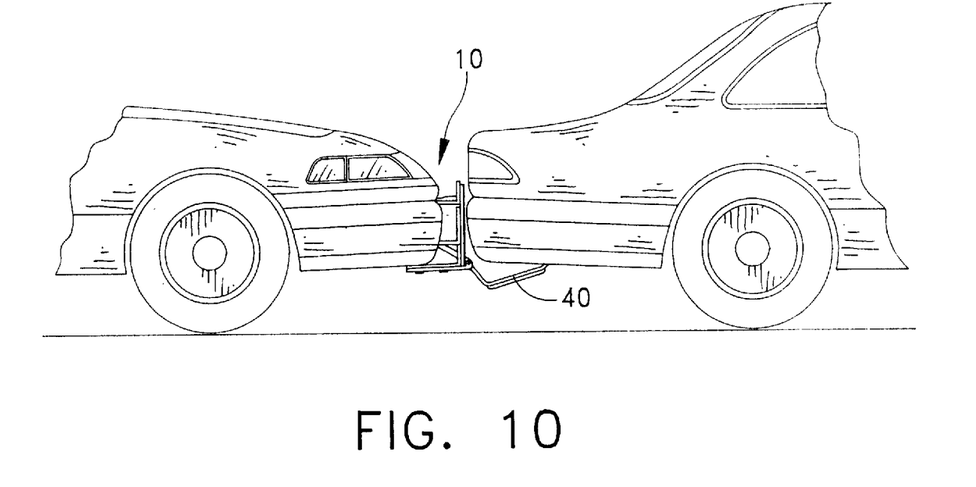
FIG. 10 shows the vehicles upon contact with each other such that the arms are moved upwardly to their second operable position in which they contact portions of the fleeing car's undercarriage and are held in such position such that the police vehicle may then brake to a stop and, in effect, capture the fleeing vehicle and the operator and passengers therein in the intended manner.

The forward surface of the upright members 18 are preferably provided with a pressure sensitive electrical switch 50 which may be in the form of a strip which extends essentially the entire length of the front surface of the upright members 18 and which in turn is connected to the activation circuit 51 of the piston 36 such when either or both of the switches 50 are activated as by the chase vehicle coming in contact with the rear bumper of the fleeing vehicle. At this point, appropriate electrical circuitry will activate the rod 34 which in turn partially rotates the bar 28 to, in effect, raise the arms upwardly to the left as shown in the drawings such that the arms will move from a position positioned underneath the fleeing vehicle to a position where the arms and/or fingers 40, 42 respectively will contact undercarriage portions of the fleeing vehicle including its bumper so as to, in effect, grasp the fleeing vehicle. It should be pointed out that the activation circuit is preferably configured such that the attempted upward movement of the arm will continue and thus effectively continue to grasp the fleeing vehicle. Should, however, unsuccessful contact with the fleeing vehicle be made or contact is otherwise terminated, the arm will move to its upper storage position and thence the operator of the chase vehicle can manually by the activation of a secondary circuit move the arms to their downwardly forwardly extending first operable position as shown in FIG. 6. As above explained, various circuitry is provided to activate the piston or other actuation mechanism between the above described three general positions that the arms 40 assume. Such control is generally electrically activated and preferably includes at least one dashboard mounted switch 53 so that the operator of the chase vehicle can activate the arms from the storage position shown in FIG. 7 to the first operable position shown in FIG. 8. Such switch 53 should also be capable of moving the arm from the first operable position to the second operable position shown in FIG. 10 where contact is made with undercarriage portions of the fleeing vehicle as well as back to the storage position of FIG. 7 and vice-versa as well as intermediate positions between these three main positions to give added flexibility to the operation of the arm. Also, the switch or switches 53 can be arranged to override switch 50 so that the operator has more control when desired.

It should also be pointed out that in the rest position, the pressure switches cannot be accidentally contacted since the arms are in their upper position forwardly thereof. Also, the circuitry can be designed such that the switches 50 can only be activated when the arms are in their forward first operable position as shown in FIG. 6. By providing such switches 50, it should be pointed out that the pursuit or chase vehicle operator does not have to concentrate on determining the opportune moment to activate the arms from the first to the second operable position since such activation is automatic when contact between the fleeing vehicle and the chase vehicle is made and thus the switches 50 activated by such contact. Obviously, such arrangement reduces the number of activities the chase vehicle operator need concentrate on. It should be apparent that once engaging contact is made with undercarriage portions of the fleeing vehicle, the operator of the chase vehicle then applies the normal braking system of the chase vehicle and brings both vehicles to a safer stop then would be otherwise achievable without the device of the present invention.

It should also be apparent that while it is preferable to have two laterally spaced arms 40 and the associated supports therefore, operable albeit somewhat less desirable results could be achieved by having only one arm but preferably centrally positioned on the bumper 14. Also, the piston and its actuation arm may be operated by either hydraulic fluid or compressed air or the activation movement to the rod 34 may be simply provided by an electro-mechanical linkage—all of which systems are well known and commercially available as are pressure activated switches.

Figure 8:
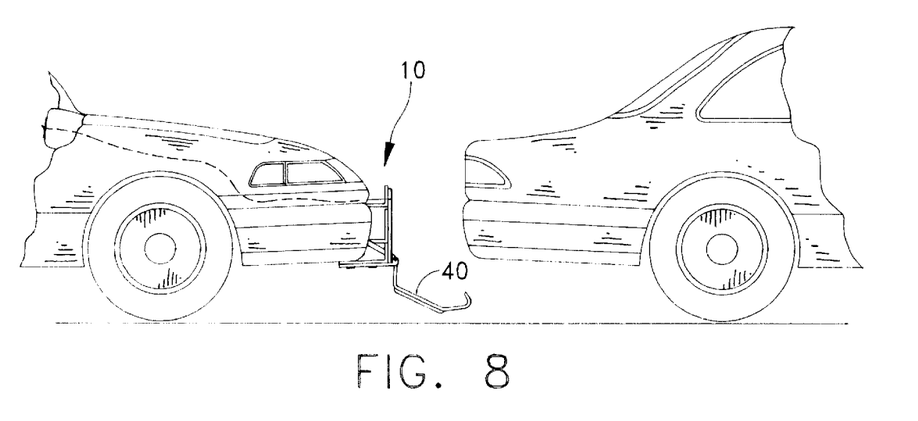
FIG. 8 is a view similar to FIG. 7 but showing the device of the present invention having been placed in the ready or first operable position.
Figure 9:
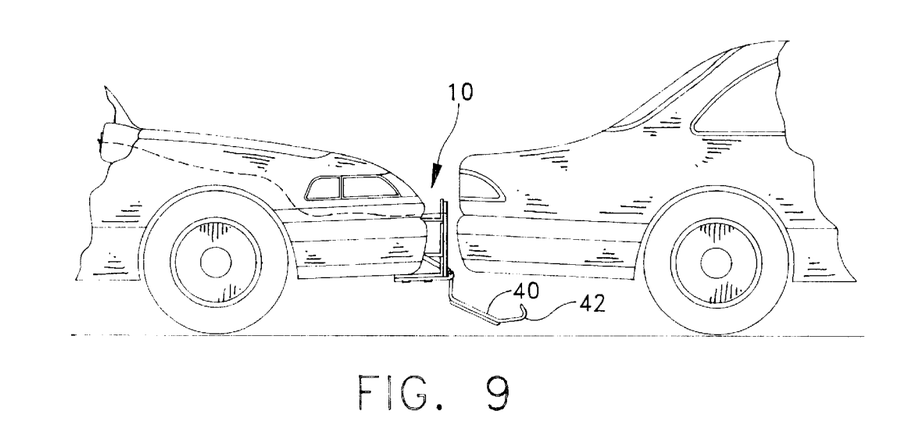
FIG. 9 is a view similar to FIG. 8 but where the pursuit vehicle has closed upon the fleeing vehicle such that the arms have been placed under the fleeing vehicle.

In reviewing the operation of the device: once the pursuit of the fleeing vehicle has been initiated, the driver of the chase vehicle which is equipped with the device of the present invention approaches the fleeing vehicle presumably from the rear, the chase vehicle operator activates the device such that the arms move to their first operable position as shown in FIG. 8. This movement is caused by activation of a switch mounted inside the chase vehicle preferably on the dashboard. Then the chase vehicle operator closes the distance between the vehicles such that the upright members contact the rear bumper of the fleeing vehicle so as to activate the arms to the second operable position as by the rearward movement of arm 34 so as to cause the bar 28 to counter rotate thus forcing the arms 40 along with the hook fingers 42 upwardly while the arms are still under the fleeing vehicle so that the arms and/or fingers will grasp undercarriage portions of the vehicle. This upward force is continued after grasping contact is made to assure continued contact while the chase vehicle is braked to slow both vehicles to an eventual stop. The grasping action is in reality contact between the arm and/or finger portions thereof and forward facing surfaces of downwardly extending undercarriage parts of the fleeing vehicle (assuming the chase and fleeing vehicles are both facing and moving forward) and such contact tends to be maintained when the chase vehicle is placing a drag as by braking upon the fleeing vehicle. The above described operation sequence is shown by the progression of FIGS. 7–10.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In combination with a chase vehicle having a front end, a capture device mounted at the front end of said chase vehicle for positively engaging portions of an undercarriage of a fleeing vehicle positioned in front of and in close adjacent contact to said chase vehicle, said capture device comprising means for attachment to the front end of the chase vehicle and at least one movable arm having an inner end and a forward end and having an upwardly extending terminal hook portion at said forward end, said arm in turn mounted on said front end and movable from a storage position to an extended first operable position wherein said arm extends outwardly and forwardly from said chase vehicle front end and beneath the undercarriage of the fleeing vehicle and subsequently to a second operable position elevated from said first operable position wherein said hook portion is capable of entrapping portions of the undercarriage of the fleeing vehicle, said hook portion having inner and outer surfaces and being open at said inner surface with said open inner surface oriented towards said chase vehicle front end in the storage position and upwardly in said operable positions, and actuation means for moving said arm from said storage position to said first operable position and subsequently to said second operable position, wherein said at least one movable arm comprises a pair of movable arms mounted in spaced lateral position upon an assembly in turn attached to a frame in turn attached to the front end of the chase vehicle, said frame including a pair of laterally spaced upright members having upper and lower ends respectively and each of said members having a front surface facing away from said chase vehicle front end, said arms each attached to said assembly at points adjacent to the lower ends of said upright members and in general lateral alignment therewith, said arms being respectively positioned in front of said upright members in said storage position.

2. The capture device of claim 1, wherein said capture device further includes a partially rotatable bar supported by said frame and upon which said arms are fixedly connected at their inner ends, said actuation means operable to rotate said bar and therefore said arms between said storage and first and second operable positions.

3. The capture device of claim 2, said bar having an offset link, said actuation means including a piston having a connecting rod mounted for reciprocal motion, said rod in turn connected to said offset link.

4. In combination with a chase vehicle having a front end, a capture device mounted at the front end of said chase vehicle for positively engaging portions of an undercarriage of a fleeing vehicle positioned in front of and in close adjacent contact to said chase vehicle, said capture device comprising means for attachment to the front end of the chase vehicle and at least one movable arm having an inner end and a forward end and having an upwardly extending terminal hook portion at said forward end, said arm in turn mounted on said front end and movable from a storage position to an extended first operable position wherein said arm extends outwardly and forwardly from said chase vehicle front end and beneath the undercarriage of the fleeing vehicle and subsequently to a second operable position elevated from said first operable position wherein said hook portion is capable of entrapping portions of the undercarriage of the fleeing vehicle, said hook portion having inner and outer surfaces and being open at said inner surface with said open inner surface oriented towards said chase vehicle front end in the storage position and upwardly in said operable positions, actuation means for moving said arm from said storage position to said first operable position and subsequently to said second operable position, said actuation means being operable to maintain the arm in said second operable position, a frame attached to the front end of the chase vehicle, and a capture device assembly including a transversely extending bar positioned adjacent said frame and mounted for partial pivotal rotation in a plane transverse to the extent of said bar, said at least one movable arm comprises a pair of movable arms, said arms in turn fixedly mounted to said bar, said actuation means including means for rotating said bar and therefore said arms downwardly and forwardly from said storage position to said extended first operable position and then upwardly and rearwardly to said second operable position.

5. A method of capturing a fleeing vehicle having a front end and a rear end and having downwardly extending undercarriage parts at the rear end thereof by pursuing such fleeing vehicle with a chase vehicle having a capture device mounted on a front end of said chase vehicle, wherein said capture device comprises a pair of laterally spaced arms mounted upon a transversely extending bar in turn mounted for partial pivotal rotation, each such arm having an inner end and a forward end and having an upwardly extending terminal hook portion at said forward end, each said arm in turn mounted on said front end and movable from a storage position to an extended first operable position wherein each said arm extends outwardly and forwardly from said chase vehicle front end and beneath the undercarriage of the fleeing vehicle and subsequently to a second operable position elevated from said first operable position wherein each said hook portion is capable of entrapping portions of the undercarriage of the fleeing vehicle, each said hook portion having inner and outer surfaces and being open at said inner surface with said open inner surface oriented towards said chase vehicle front end in the storage position and upwardly in said operable positions, and actuation means for moving said arms from said storage position to said first operable position and subsequently to said second operable position, the method comprising the steps of maneuvering the chase vehicle close to the rear end of the fleeing vehicle, activating said capture device from its storage position to said first operable position, thereafter maneuvering the chase vehicle adjacent the rear end of the fleeing vehicle so as to place portions of the arms beneath the fleeing vehicle and while said arms are so positioned activating the arms to their second operable position wherein the arms move upwardly into contact with portions of the fleeing vehicle's undercarriage and thereafter braking the chase vehicle to slow both of the vehicles.

6. The capture method of claim 5, wherein the capture device actuation means includes a pressure activated switch mounted behind at least one of said arms in its storage position and forwardly exposed for contact with portions of the fleeing vehicle when the arms are in the first operable position for automatically moving the arms from the first operable position to the second operable position when contacting portions of said fleeing vehicle and wherein the operator of the chase vehicle forces contact between the chase and fleeing vehicles after activating the arms to their first operable position and placing the vehicles in close proximity so that the arms project beneath the fleeing vehicle and wherein such contact automatically activates the arms to said second operable position.

* * * * *